Patented July 16, 1929.

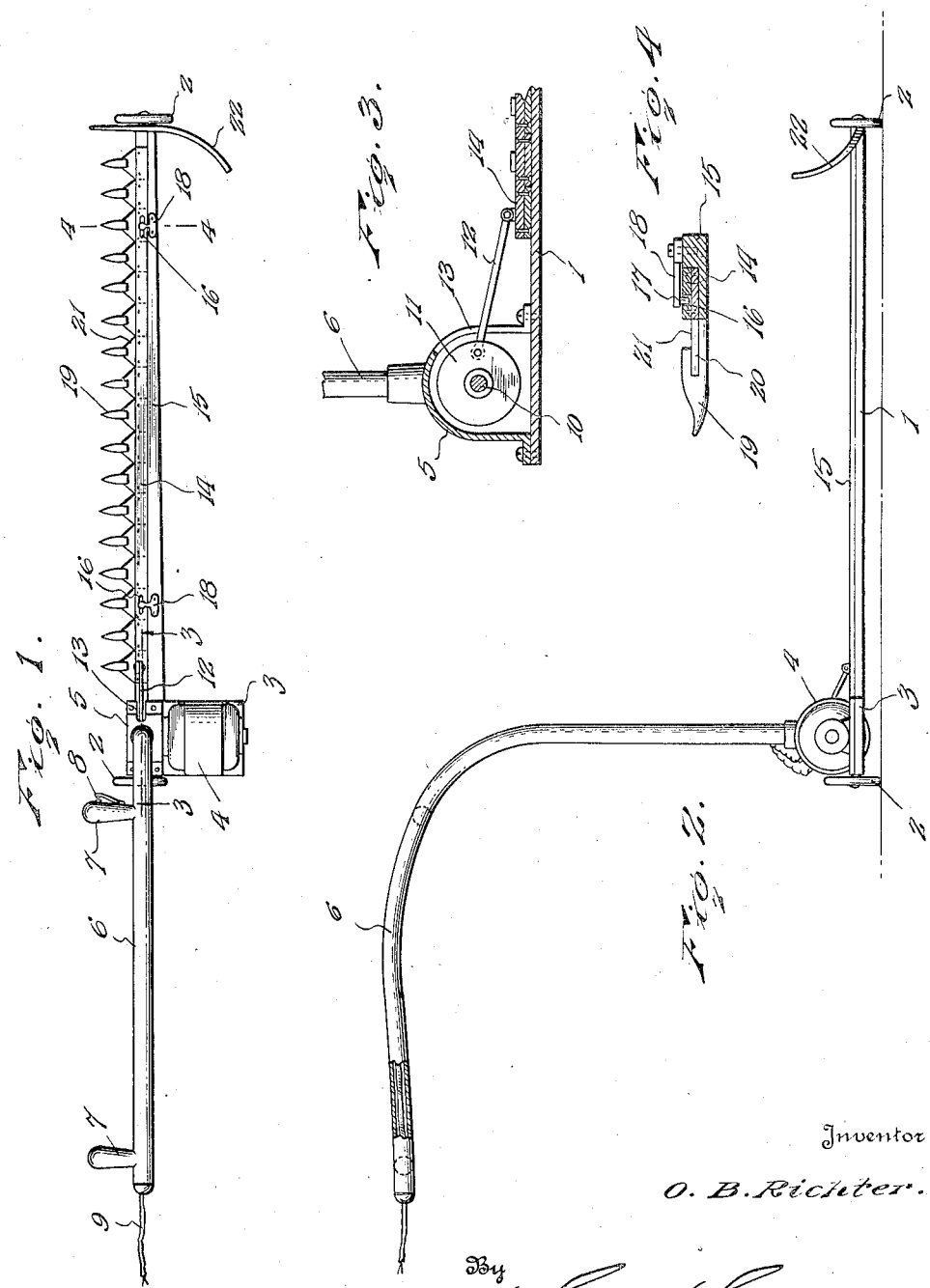

1,721,090

UNITED STATES PATENT OFFICE.

ORRIE B. RICHTER, OF LA CROSSE, WISCONSIN.

MOWER.

Application filed July 27, 1927. Serial No. 208,840.

The object of this invention is to provide a power driven apparatus especially adapted for cutting away weeds and grass at the sides of a railroad track and which may be easily controlled manually. The invention also has for its object the provision of an apparatus for the stated purpose which, while efficient in operation, will be composed of few parts arranged in a simple manner so that it will be free of excess weight and may be produced and operated at a low cost. These stated objects, and other objects which will incidentally appear in the course of the following description, are attained in such an apparatus as is illustrated in the accompanying drawing, and the invention resides in certain novel features which will be particularly pointed out in the appended claims.

In the drawing:

Figure 1 is a plan view of an apparatus embodying the invention;

Fig. 2 is a rear elevation of the same;

Fig. 3 is an enlarged detail section on the line 3—3 of Fig. 1, and

Fig. 4 is an enlarged detail section on the line 4—4 of Fig. 1.

In carrying out the invention, there is provided a frame consisting of a bar 1 equipped at its ends with ground wheels or rollers 2 whereby it may be easily propelled over the ground and will be supported in such a manner that the knives or other working elements will be held against digging into the soil. At one end, the frame bar 1 carries a small platform 3 upon which is mounted a motor 4 which is preferably electrical and is illustrated conventionally. In advance of the motor, a bracket 5 of arched form is secured upon the platform and secured to and rising from the said bracket is a snath 6 which has its upper portion turned laterally and equipped on its forward side with hand grips 7, one of said grips being equipped with a circuit closer or switch 8 of any convenient type which may be easily controlled by the fingers of the operator. The snath is hollow, as clearly shown in Fig. 2, and a cable 9 carrying electricity is led through the snath from any source of supply to the motor 4 in an obvious manner. The motor shaft 10 is extended forwardly to terminate within the bracket or housing 5 and is equipped at its front end with a crank disk 11 to which is pivoted one end of a pitman 12 which extends outwardly through a slot or opening 13 formed in the side of the bracket or housing and has its outer end pivotally connected to a cutter bar 14, said cutter bar being slidably supported upon a finger bar 15 which is secured upon the frame bar 1, as will be understood upon reference to Figs. 2 and 3. At selected points in the length of the cutter bar, longitudinal slots 16 are formed therein, and these slots are engaged by studs 17 on the front ends of guide arms 18 which are secured upon the top of the finger bar and project forwardly over the cutter bar, as shown clearly in Fig. 4. By this arrangement the cutter bar is held to rectilinear movement and is retained upon the finger bar in a simple and efficient manner. Guard fingers 19 are secured to and project forwardly from the finger bar and carry lower stationary knives or ledger plates 20, while upper knives 21 are secured to the cutter bar and project forwardly therefrom over the stationary knives to cooperate therewith in cutting down the weeds and other growth which it is desired to eliminate. At the outer end of the structure is a divider 22 which is adapted to pass through the vegetation and throw the mowed stems inwardly away from the standing growth so that the desired clearing will be effected.

It is thought the use of the machine will be understood from the foregoing description, taken in connection with the accompanying drawing. The machine is placed upon the ground at the side of the track and the operator assumes a position back of the snath and grasps the grips 7 so that he may hold the device by its snath during its operation similar to the manner in which a scythe is held, and when he grasps the inner grip 7 he automatically presses upon the outer member of the switch 8 so as to close the circuit and start the motor. The rotation of the motor shaft is transmitted directly to the crank disk 11 and the pitman 12 and cutter bar 14 are thereby reciprocated so that when the operator grasps the machine by its snath with the finger bar extending from one side of him and walks along with it the rapidly moving knives will cut through the growth in an effective manner and cause the vegetation to fall at the rear of the machine but the device may be swung in the manner of a scythe. Therefore, it is not necessary for the operator to drag a blade through the vegetation and he will be relieved from practically all exertion necessary when using a scythe no matter which way he uses it. The wheels 2 may be omitted if so desired. The construction of the apparatus is very simple and the parts are compactly arranged so that it is light while at the same time possessing ample strength to resist the strains which it will encounter in use. When operating along trolley roads, the current may be obtained through a suitable collector arranged to be engaged over the trolley wires and when used along steam roads the current may be obtained from any conducting cables in the immediate vicinity or if current is not otherwise available a work car may be provided with a local generator.

Having thus described the invention, I claim:

1. An apparatus for the purpose set forth comprising a portable frame, a motor mounted on the frame, a hollow snath rising from the frame, hand grips extending transversely from said snath, electric conductors housed within the snath and connected with the motor, a circuit closer carried by one hand grip, a cutter mounted on the frame, and operative connections between the cutter and the motor.

2. An apparatus for the purpose set forth comprising a portable frame, a bracket secured upon the frame and extending upwardly therefrom and formed with a vertical slot in one side, a snath rising from said bracket, a crank disk housed within the bracket, means on the frame for rotating said crank disk including a rotary shaft carrying the disk, a cutter mounted for reciprocation on the frame, and a pitman extending through said slot and connecting said cutter with the crank disk.

3. An apparatus for the purpose set forth comprising a frame bar, a cutter bar slidably mounted on the frame bar at the front side of the same and movable longitudinally thereof, cutters carried by the cutter bar, the cutter bar being provided with longitudinal slots, arms secured on the frame bar at the rear of the cutter bar and extending forwardly over the cutter bar and provided with depending studs engaging in the slots in the cutter bar to guide and limit movement of the bar, and means on the frame bar for operating the cutter bar.

4. A device of the character described comprising a cutter bar, fingers disposed transversely of the bar and projecting from the forward side edge thereof, knives slidable upon said bar longitudinally thereof and projecting forwardly therefrom in operative relation to the fingers, means for actuating said knives, and a snath extending upwardly from one end of said bar and projecting longitudinally away from the bar.

5. A device of the character described comprising a cutter bar, cutting blades movably carried by said bar and projecting from the forward side edge thereof, a snath extending upwardly from one end of said bar with its upper portion extending away from the bar, and means for imparting movement to said blades.

6. A device of the character described comprising a cutter bar, cutting blades movably carried by said bar and projecting from the forward side edge thereof, a snath extending upwardly from one end of said bar with its upper portion extending away from the bar, a motor carried by said bar and operatively connected with said blades to impart movement thereto, and control means for said motor carried by said snath.

In testimony whereof I affix my signature.

ORRIE B. RICHTER. [L. S.]